United States Patent
Lamar et al.

(10) Patent No.: US 10,608,430 B2
(45) Date of Patent: Mar. 31, 2020

(54) SWITCHED ELECTRICAL OVERSTRESS PROTECTION

(71) Applicant: Allegro MicroSystems, LLC, Manchester, NH (US)

(72) Inventors: Washington Lamar, Mount Vernon, NH (US); Maxim Klebanov, Newton, MA (US)

(73) Assignee: ALLEGRO MICROSYSTEMS, LLC, Manchester, NH (US)

( * ) Notice: Subject to any disclaimer, the term of this patent is extended or adjusted under 35 U.S.C. 154(b) by 245 days.

(21) Appl. No.: 15/272,784

(22) Filed: Sep. 22, 2016

(65) Prior Publication Data
US 2018/0083442 A1    Mar. 22, 2018

(51) Int. Cl.
*H02H 9/00*    (2006.01)
*H02H 9/04*    (2006.01)

(52) U.S. Cl.
CPC .................. *H02H 9/041* (2013.01)

(58) Field of Classification Search
CPC ....................................................... H02H 9/046
USPC .................................................... 361/56, 111
See application file for complete search history.

(56) References Cited

U.S. PATENT DOCUMENTS

| | | | | |
|---|---|---|---|---|
| 4,445,183 A * | 4/1984 | McCollum | ........... | H02H 3/0935 361/13 |
| 5,432,471 A * | 7/1995 | Majumdar | ......... | H03K 17/0822 327/310 |
| 5,550,702 A * | 8/1996 | Schmidt | ................. | H02H 9/025 361/103 |
| 5,563,573 A * | 10/1996 | Ng | ............................ | H03F 1/56 338/215 |
| 6,630,748 B2 * | 10/2003 | Sato | ................... | H03K 17/0822 307/10.1 |
| 8,892,903 B1 * | 11/2014 | Trimberger | ........... | G06F 21/558 713/189 |
| 8,922,962 B2 | 12/2014 | Lamar et al. | | |
| 9,148,015 B2 * | 9/2015 | Kato | ...................... | H02H 9/046 |
| 9,318,481 B1 | 4/2016 | Wang et al. | | |
| 9,368,486 B2 | 6/2016 | Wang et al. | | |
| 2011/0043955 A1 * | 2/2011 | Noda | ...................... | H02H 9/046 361/56 |
| 2014/0036552 A1 * | 2/2014 | Saji | ........................ | H02M 1/44 363/21.17 |
| 2016/0233670 A1 | 8/2016 | Klebanov et al. | | |
| 2016/0282893 A1 | 9/2016 | Cooper et al. | | |

OTHER PUBLICATIONS

U.S. Appl. No. 15/245,689, filed Aug. 24, 2016, Klebanov et al.
U.S. Appl. No. 15/089,787, filed Apr. 4, 2016, Kuo et al.
U.S. Appl. No. 15/053,397, filed Feb. 25, 2016, Wilkinson et al.
U.S. Appl. No. 15/245,699, filed Aug. 24, 2016, Lamar et al.

* cited by examiner

*Primary Examiner* — Thienvu V Tran
*Assistant Examiner* — Lucy M Thomas
(74) *Attorney, Agent, or Firm* — Daly, Crowley, Mofford & Durkee, LLP

(57) ABSTRACT

An apparatus includes a first terminal, a second terminal, and a conduction path circuit coupled between the first and second terminals. The conduction path circuit includes an input terminal to receive an enable signal which, when activated, allows the conduction path circuit to conduct electrical current between the first and second terminal. A control circuit coupled to the input terminal of the conduction path circuit is configured to selectively activate the enable signal.

23 Claims, 11 Drawing Sheets

SWITCHED ELECTRICAL OVERSTRESS PROTECTION

FIELD

This disclosure relates to overvoltage or ESD condition protection and, more particularly, to apparatuses having multiple, switched overvoltage protection paths.

BACKGROUND

Overvoltage stress events, including electrostatic discharge (ESD) events, electromagnetic impulse (EMI) events, electromagnetic pulse (EMP) events, and the like, can cause circuits to become damaged or malfunction. ESD events typically occur when a large voltage, often from build-up of static electricity, comes in contact with two terminals of a circuit. During manufacturing, human technicians can build up static charges. If a technician touches terminals of a circuit, for example if the technician is handling an integrated circuit part and touches external leads of the part, then the static charge can flow into the part and cause damage.

Many circuits include conduction path circuits that, in the case of an ESD event, direct and/or dissipate the ESD current so that damage does not occur to the part. Because of the high voltages associated with static charge buildup, these conduction path circuits often include high voltage or high power components that can withstand the power (and heat) dissipated by the ESD-related current. Using high voltage or high power components can be expensive in terms of part cost. If the circuit is an integrated circuit, the high voltage and power components may also require a relatively large semiconductor area.

SUMMARY

In an embodiment, an apparatus includes a first terminal, a second terminal, a conduction path circuit coupled between the first and second terminals, wherein the conduction path circuit includes an input terminal to receive an enable signal which, when activated, allows the conduction path circuit to conduct electrical current between the first and second terminals, and a control circuit coupled to the input terminal of the conduction path circuit and configured to selectively activate the enable signal.

One or more of the following features may be included. The apparatus may include a package. The first and second terminals may extend outside the package.

The conduction path circuit may include a Zener diode and a switch. The enable signal may operate to open and close the switch. The switch may be a transistor.

An overvoltage detect circuit may be included. The control circuit may activate the enable signal in response to an overvoltage signal from the overvoltage detect circuit indicating that an overvoltage event was detected. The overvoltage signal may activate a clock circuit of the control circuit or couple a clock circuit to an enable signal of the conduction path circuit.

The apparatus may include a plurality of conduction path circuits coupled between the first and second terminals, each protection circuit including an input terminal to receive a respective enable signal which, when activated, allows the respective conduction path circuit to conduct electrical current between the first and second terminals, wherein the control circuit is coupled to the input terminal of each of the conduction path circuits and configured to actively select the enable signal of each of the plurality of conduction path circuits.

The control circuit may be configured to activate the enable signals of each of the plurality of conduction path circuits according to a random or pseudo-random pattern. The control circuit may be configured to activate the enable signals of each of the plurality of conduction path circuits according to a predetermined pattern. The control circuit may be configured to activate the enable signal of one of the plurality of the conduction path circuits at a time. The control circuit may be configured to activate the enable signal of multiple conduction path circuits at a time.

The apparatus may include a temperature sense circuit to measure a temperature of the conduction path circuit. The temperature control circuit may be configured to activate the conduction path circuit in response to the measured temperature of the conduction path circuit. The control circuit may selectively activate and deactivate the enable signal at a first frequency or duty cycle if the conduction path circuit is subject to first temperature and at a second frequency or duty cycle if the conduction path circuit is subject to a second temperature.

The apparatus may also include an conduction path circuit without an input circuit to receive an enable signal.

In another embodiment, a method comprises detecting an electrical overstress event by an electrical overstress detection circuit; providing a signal representing detection of the electrical overstress detection circuit to a control circuit; and in response to receiving the signal, selectively activating, by the control circuit, a signal to enable or disable current flow through one or more conduction path circuits, wherein the conduction path circuits comprise clamp circuits having a mechanism to enable or disable current flow through the conduction path circuits.

One or more of the following features may be included.

Selectively activating may include enabling and disabling the current flow through the one or more conduction path circuits according to a random, pseudo-random, or predetermined pattern. Selectively activating may include enabling and disabling the current flow through the one or more conduction path circuits at a relatively high frequency or duty cycle if the one or more conduction path circuits is subject to first temperature and at a relatively low frequency or duty cycle if the one or more conduction path circuits is subject to a second temperature.

A temperature of and/or current through the one or more conduction path circuits may be measured. Selectively activating the one or more conduction path circuits may include choosing a frequency and/or duty cycle at which to enable and disable the current flow through the one or more conduction path circuits based on the measured temperature of the one or more conduction path circuits.

BRIEF DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more exemplary embodiments. Accordingly, the figures are not intended to limit the scope of the invention. Like reference numbers in the figures denote like elements.

DETAILED DESCRIPTION

As used herein, the term "magnetic field sensing element" is used to describe a variety of electronic elements that can sense a magnetic field. The magnetic field sensing element can be, but is not limited to, a Hall Effect element, a magnetoresistance element, or a magnetotransistor. As is known, there are different types of Hall Effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

As used herein, the terms "target" and "magnetic target" are used to describe an object to be sensed or detected by a magnetic field sensor or magnetic field sensing element.

Figure 1:
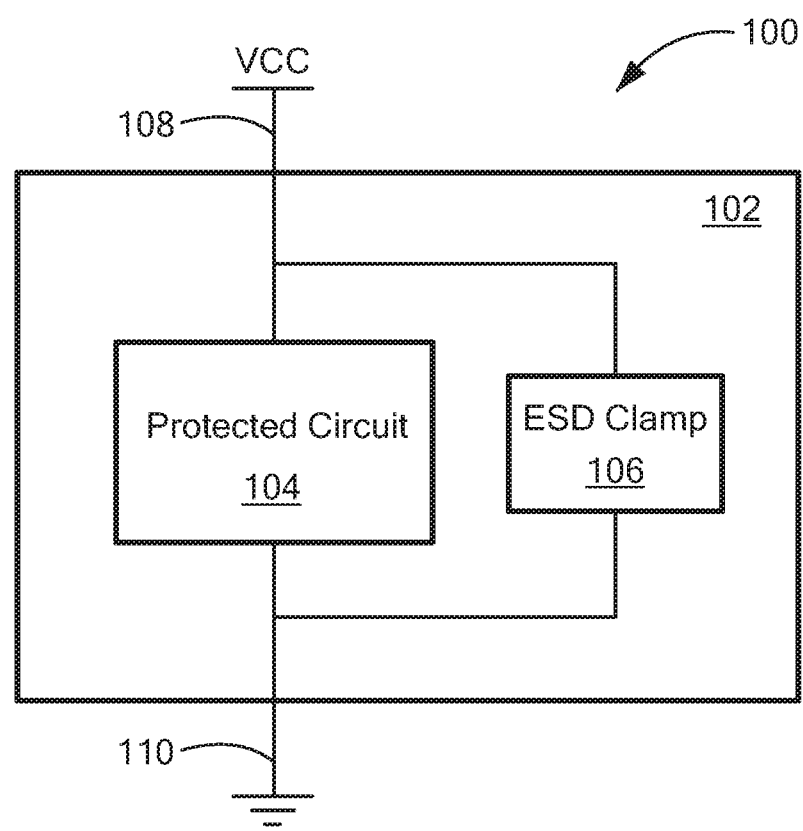
FIG. 1 is a block diagram of a circuit of the prior art that has ESD protection.

FIG. 1 is a block diagram of an integrated circuit 100 of the prior art. Circuit 100 may be any type of circuit including, but not limited to, magnetic field sensors described above. Circuit 100 may include a package 102 that contains a semiconductor substrate that supports various circuits according to techniques known in the art. These circuits may include a protected circuit 104 and an ESD clamp circuit 106. Integrated circuit 100 may include at least two external leads or pins 108 and 110 that extend to the exterior of package 102. In the example shown, lead 108 is coupled to a power supply VCC and lead 110 is coupled to ground. Although not shown, integrated circuit 100 may include a lead frame and lead wires or wire loads, or other technologies known in the art, that provide electrical connections between external pins 108 and 110, and protected circuit 104.

Protected circuit 104 may include any type of circuit including, but not limited to, a magnetic field sensor. As is known, integrated circuits may be subject to damage or malfunction if exposed to an overstress condition. For example, if an ESD event occurs between pins 108 and 110, uncontrolled current may flow between pins 108 and 110 and through protected circuit 104, which may damage protected circuit 104 and/or cause it to malfunction.

ESD clamp circuit 106 may provide protection from ESD or other types of overstress events so that protected circuit 104 does not malfunction or become damaged. During normal operation, ESD clamp circuit 106 may act as an open circuit. However, if the voltage between pints 108 and 110 becomes too high, then ESD clamp circuit 106 may allow current associated with the overvoltage condition to flow through ESD clamp circuit 106 instead of through protected circuit 104. Because the current is directed away from protected circuit 104, protected circuit 104 may avoid malfunction or damage from the overvoltage condition. However, if too much power is dissipated by conduction path circuit 106, then it too may malfunction or become damaged.

Figure 2:
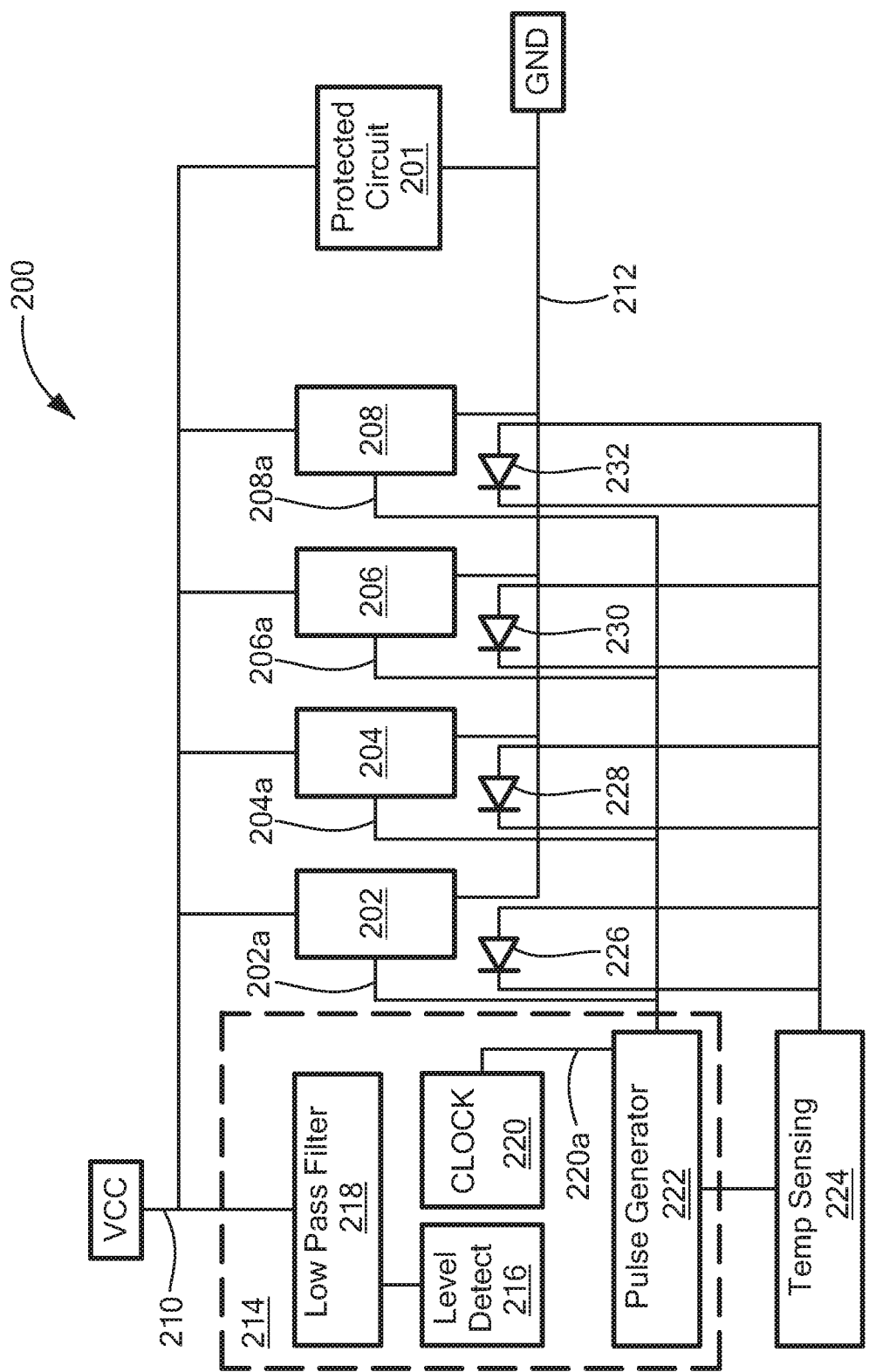
FIG. 2 is a block diagram of a circuit having multiple conduction path circuits.

Referring to FIG. 2, circuit 200 may include a protected circuit 201 and a plurality of conduction path circuits 202-208. Conduction path circuits 202-208 may be circuits that conduct current under certain circumstances, as will be described below. Conduction path circuits 202-208 may be used to dissipate current related to an overvoltage or electrical overstress event, such as an ESD event, an EMI event, an EMP event, and the like.

Although not shown, circuit 200 may include a semiconductor substrate that supports protected circuit 201 and conduction path circuits 202-208. In embodiments, circuit 201 may also include a lead frame or other structure that provides electrical connection between protected circuit 201, conduction path circuits 202-208, and external pins or leads of circuit 200. For example, terminal 210 may be an external pin or lead that can be coupled to a power supply VCC and terminal 212 may be an external pin or lead that can be coupled to ground. Although not shown, protected circuit 201 may also have other terminals that can be coupled to other external circuits, such as I/O terminals, reference voltage terminals, control terminals, etc. One skilled in the art will recognize that, while conduction path circuits 202-208 are shown coupled between power terminal 210 and ground terminal 212, embodiments of circuit 200 may include conduction path circuits coupled between any external terminals to protect protected circuit 201 from ESD events.

Although four conduction path circuits 202-208 are shown, circuit 200 may include fewer or more than four conduction path circuits.

Some or all of conduction path circuits 202-208 may receive a respective enable signal 202a-208a that allows the conduction path circuit to conduct current. The enable signal may be a digital or switched signal that can provide a logic high value and a logic low value. When the enable signal is high, the respective conduction path circuit may be "on" and may allow current to flow through the conduction path circuit. When the enable signal is low, the respective conduction path circuit may be "off" and may act as an open circuit, preventing current from flowing through the conduction path circuit. In other embodiments, a logic low value will turn the conduction path circuit on and a high value will turn the conduction path circuit off. Signals 202a-208a may also be analog signals that cause the conduction path circuit to turn on and off when the value of the analog signal crosses a predetermined threshold.

Circuit 200 may also include a clamp control circuit 214 configured to selectively turn conduction path circuits 202-208 on and off. Clamp control circuit 214 may include a level detect circuit 216 that senses an overvoltage condition. For example, level detect circuit 216 may sense the voltage between terminal 210 and terminal 212. Level detect circuit 216 may include a comparator or other circuitry to detect whether the voltage (or current) between terminals 210 and 212 exceeds a particular threshold voltage (or current). Clamp control circuit 214 may also include a low pass filter 218 coupled to level detect circuit 216. Low pass filter 218 may block high-frequency noise on the voltage signal at terminal 210 in order to reduce the chance that noise on the voltage signal will cause clamp control circuit 214 to erroneously detect an overvoltage condition.

Clamp control circuit 214 may also include a clock circuit 220 and pulse generator circuit 222. Clock circuit 220 may provide a clock signal 220a to pulse generator 222. When pulse generator 222 receives the clock signal 220a, pulse generator 222 may drive signals 202a, 204a, 206a, and 208a high and low to turn conduction path circuits 202-208 on and off. In the embodiment shown, clamp circuit 214 may control conduction path circuits 202-208 by turning clock circuit 220 on or off. When clock circuit 220 is on, pulse generator 222 drives signals 202a-208a to control conduction path circuits 202-208. When clock circuit 220 is off, pulse generator 222 may not drive signals 202a-208a.

In other embodiments, clock 220 and pulse generator 222 may be replaced by any circuit or processor that can drive signals 202a-208a to control conduction path circuits 202-208. Such circuits may include a processor executing software or firmware, a shift register, a pattern generator, etc.

Circuit 200 may also include a temperature sensing circuit 224 configured to measure the temperature of each conduction path circuit 202-208. Temperature sensing circuit 224 may be coupled to temperature sensors 226-232, which may be positioned near a respective conduction path circuit 202-208. In an embodiment, temperature sensors 226-232 are diodes having temperature dependencies. Temperature sensing circuit 224 may measure the current through the respective diodes to determine the temperature at or near a respective temperature sensing circuit 202-208.

In operation, level detect circuit 216 may detect whether an overvoltage condition is present between terminals 210 and 212 by, for example, comparing the voltage between terminals 210 and 212 to a predetermined threshold voltage. If an overvoltage condition exists, level detect circuit 216 may activate clock 220 which, in turn, may activate pulse generator 222. Pulse generator 222 may selectively activate conduction path circuits 202-208 so that one or more of conduction path circuits 202-208 will conduct current between terminals 210 and 212 in response to the detected overvoltage condition.

In an embodiment, temperature sensing circuit 224 may measure the temperature of each conduction path circuit 202-208 while the conduction path circuits are conducting current, and transmit the measured temperature to clamp control circuit 214. If the measured temperature of any of the conduction path circuits 202-208 is too high (e.g. if the measured temperature exceeds a predetermined threshold or tolerance), clamp control circuit 214 may turn that particular conduction path circuit off and allow the remaining conduction path circuits to conduct the current from the overvoltage condition. In an embodiment, instead of turning the conduction path circuit off, clamp control circuit may modify a duty cycle of the conduction path circuit so that the conduction path circuit is conducting for a smaller percentage of time.

Figure 2A:
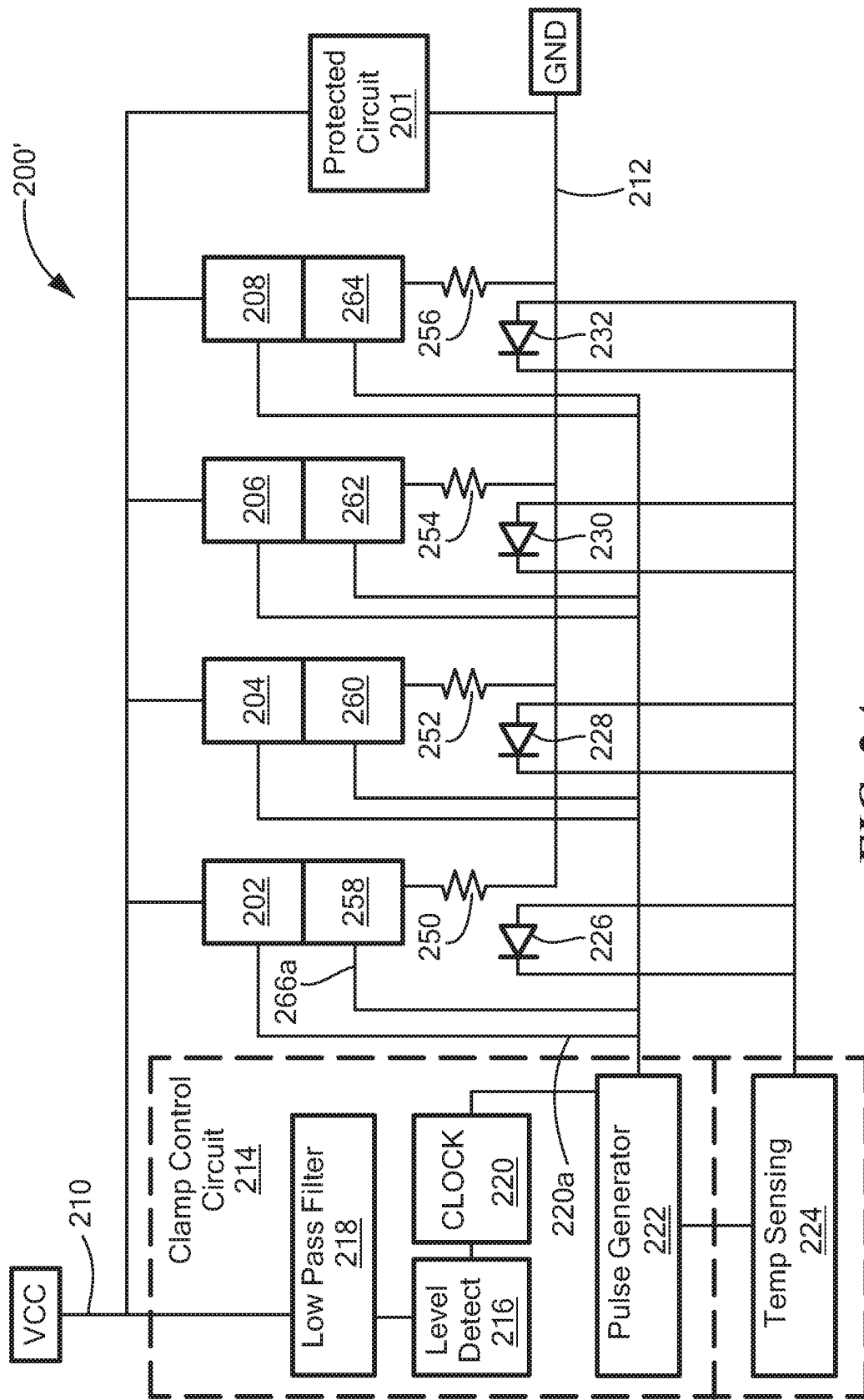
FIG. 2A is a block diagram of a circuit having multiple conduction path circuits and sense resistors.

Circuit 200' in FIG. 2A may be the same as or similar to circuit 200. The embodiment illustrated by circuit 200' may include current sense circuits 250-256 to measure the current flowing through respective conduction path circuits 202-208. Current sense circuits 250-256 may comprise resistors coupled in series with conduction path circuits 202-208. The resistors may have a low value (e.g. about $\frac{1}{10}$ Ohm) and/or may be high power resistors to allow current from electrical overstress conditions to flow through the resistor without producing excessive heat or causing damage.

Circuit 200' may also include shutdown circuits 258-264 which may shut down (e.g. turn off) respective conduction path circuits 202-208 if the temperature or current through the respective conduction path circuit exceeds a predetermined threshold.

Figure 2B:
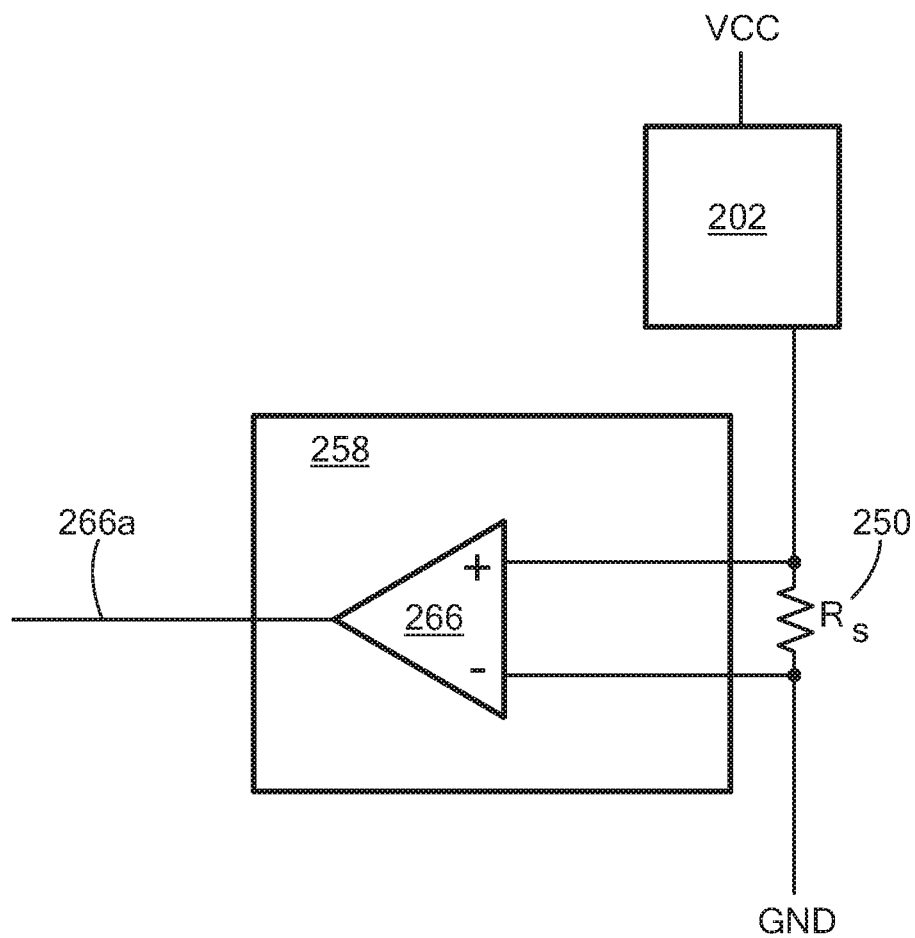
FIG. 2B is a block diagram of a conduction path circuit with a thermal shutdown circuit.

FIG. 2B is a block diagram of conduction path circuit 202, shutdown circuit 258, and current sense resistor 250. Shutdown circuit 258 may include comparator 266 having its positive terminal coupled to the high side of current sense resistor 250 and its negative input terminal coupled to ground (or the low side of current sense resistor 250). When current flows through current sense resistor 250, i.e. when conduction path circuit 202 is conducting current, there will be a positive voltage across current sense resistor 250. The positive voltage will cause comparator 266 to provide a logic high value on its output (i.e. on signal 266a). Thus, signal 266a may be high whenever current is flowing through conduction path circuit 202.

In other embodiments, comparator 266 may have an offset voltage so that it provides a logic high value when the voltage across resistor 250 (and thus the current through conduction path circuit 202) is greater than a threshold value.

Referring again to FIG. 2A, signal 266a may be received by clamp control circuit 214. Clamp control circuit 214 may monitor signal 266a to determine how much current is flowing through conduction path circuit 202 and for how long. If the amount of current or duration of conduction exceeds a predetermined threshold, clamp control circuit 214 may disable conduction path circuit 202 from conducting additional current and utilize the other conduction path circuits 202-208 to conduct any remaining current associated with the electrical overstress condition. The other shutdown circuits 260-264 may operate similarly to shutdown circuit 258. Thus, clamp control circuit 214 may monitor the current through any or all conduction path circuits 202-208 and enable or disable them as needed during operation.

Figure 2C:
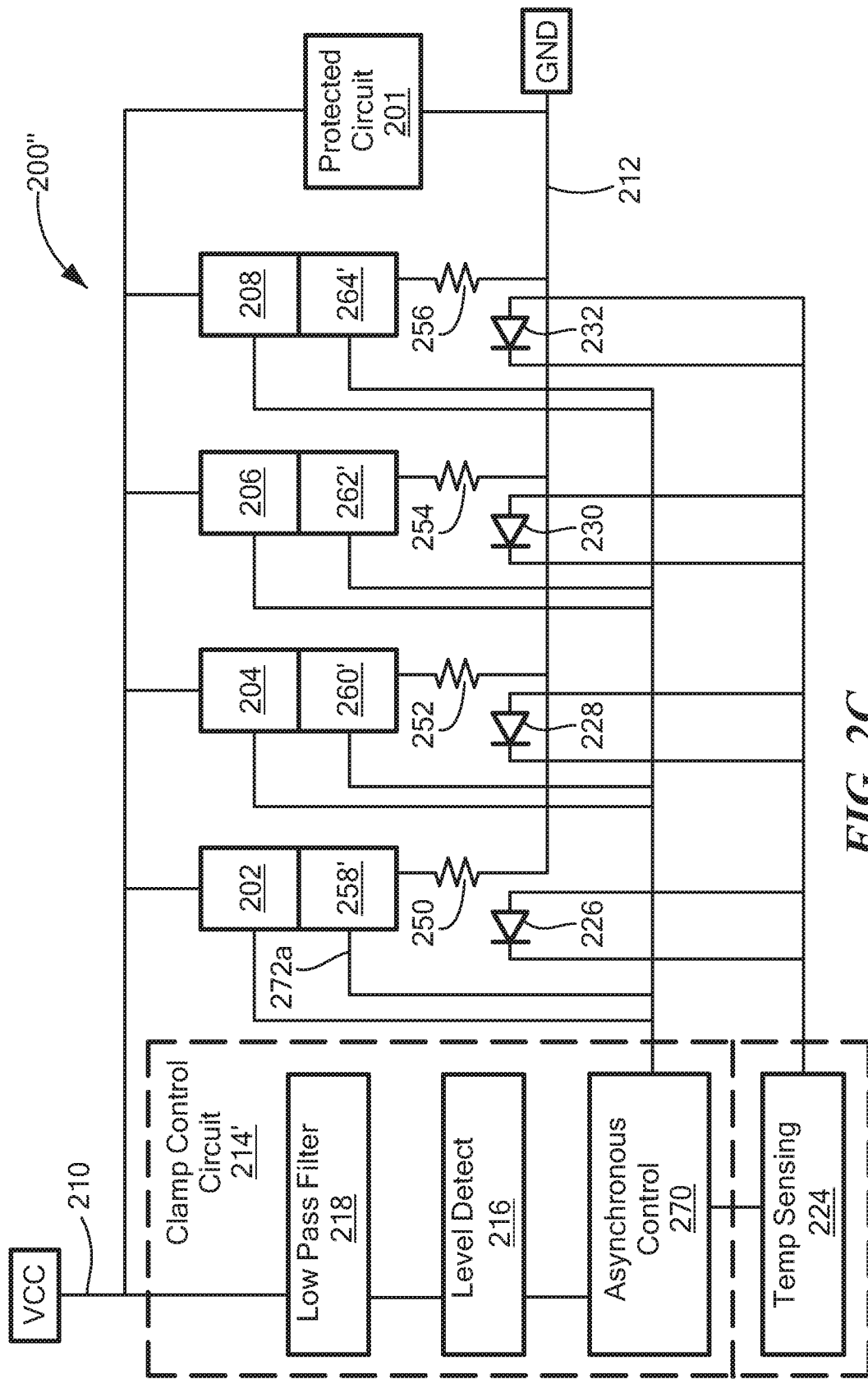
FIG. 2C is a block diagram of a circuit having multiple conduction path circuits and asynchronous control.

Turning now to FIG. 2C, circuit 200" may be the same as or similar to circuit 200' and/or circuit 200. The embodiment illustrated by circuit 200" may include clamp control circuit 214' having an asynchronous control circuit 270, which may enable and disable conduction path circuits 202-208 in an asynchronous manner without the use of a clock circuit. In addition, circuit 200" may include shutdown circuits 258'-264', which may be configured to operate in an asynchronous environment.

Asynchronous control circuit 270 may monitor and react to signals from shutdown circuits 258'-264' by shutting down or disabling one or more of conduction path circuits 202-208 in response to the signals received from shutdown circuits 258'-264'. Upon receiving the signal indicating a temperature or current that exceeds the predetermine threshold, asynchronous control circuit 270 may disable the corresponding conduction path circuit for a predetermined amount of time to allow the conduction path circuit to cool as necessary. Asynchronous control circuit 270 may include timing circuits (such as a resistor-capacitor charging circuit, for example) to control the amount of time each conduction path circuit is disabled. Asynchronous control circuit 270 may also include logic circuits that prevent all conduction path circuits 202-208 from being disabled at the same time.

In an embodiment, control of conduction path circuits 202-208 may be analog in nature. For example, instead of turning conduction path circuits 202-208 completely on or completely off, the conductivity conduction path circuits 202-208 may be adjusted to intermediate values. A conduction path circuit that is set to an intermediate conductivity value may act as a resistive circuit rather than an open or short circuit. In other words, the conductivity value may be set to a value that is greater than the conductivity of an open circuit and less than the conductivity of a short circuit. Adjusting the conductivity may be achieved, for example, by operating a series-connected transistor in the linear region so that the current through the transistor (and thus current through the conduction path circuit) can be controlled.

Figure 2D:
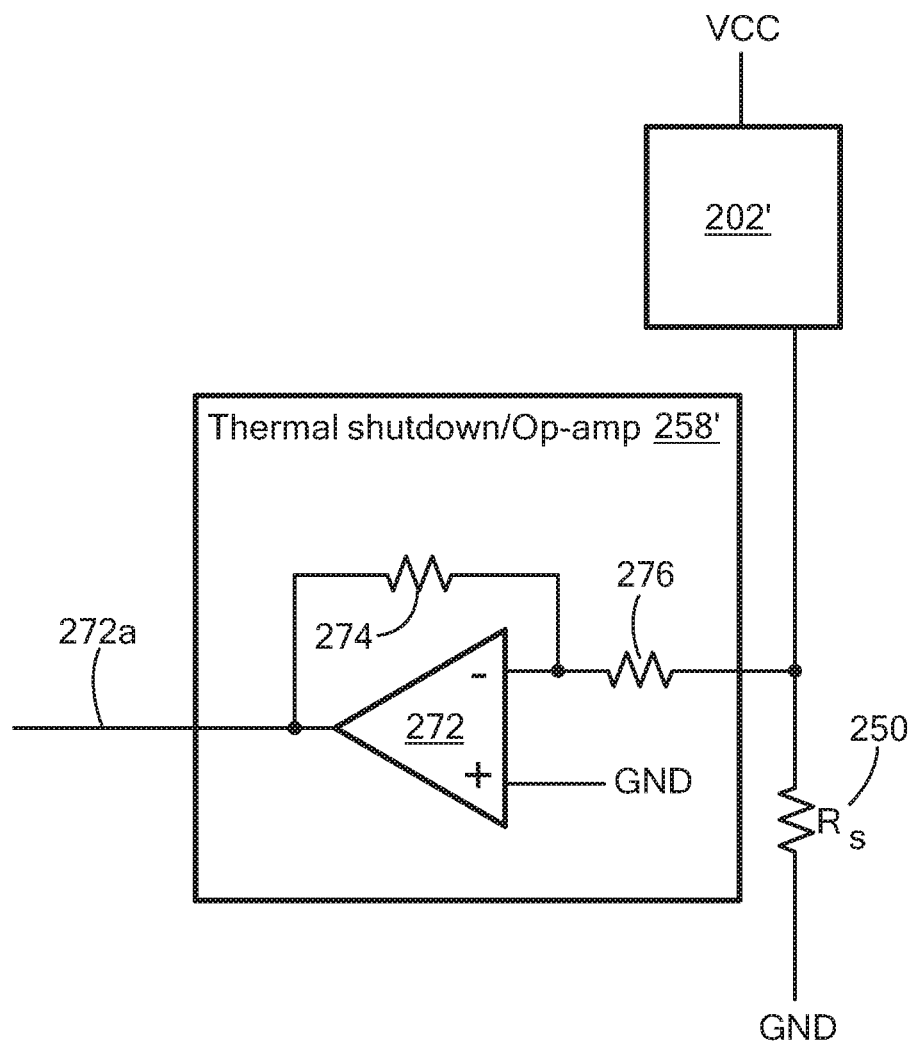
FIG. 2D is a block diagram of a conduction path circuit with an asynchronous thermal shutdown circuit.

FIG. 2D is a block diagram of conduction path circuit 202, shutdown circuit 258', and current sense resistor 250. Shutdown circuit 258' may include operational amplifier 272 having its positive terminal coupled to ground and its negative terminal coupled to the high side of current sense resistor 250 through resistor 276. Resistor 274 provides a negative feedback loop from the output of operational amplifier 272 to the negative input terminal. In this configuration, operational amplifier may act as an amplifier that amplifies the voltage across resistor 250. The gain of the amplifier may be controlled by resistors 274 and 276.

When current flows through current sense resistor 250, i.e. when conduction path circuit 202 is conducting current, there will be a positive voltage across current sense resistor 250. Operational amplifier 272 may amplify the voltage across resistor 250 and provide amplified signal 272a as an output.

Referring again to FIG. 2C, signal 272a may be received by asynchronous control circuit 270. If signal 272a exceeds a predetermined voltage threshold, asynchronous control circuit may disable conduction path circuit 202. As noted above, asynchronous control circuit may include a timing circuit to control the duration that conduction path circuit 202 is disabled. The other shutdown circuits 260'-264' may operate similarly to shutdown circuit 258'. Thus, clamp control circuit 214 may monitor the current through any or all conduction path circuits 202-208 and disable them as needed during operation.

As noted above, asynchronous clamp control circuit 214' may operate without a clock that controls timing, logic circuits, etc. Instead, asynchronous control circuit may disable a respective conduction path circuit 202-208 in direct response to receiving a respective signal from a respective shutdown circuit 258'-264'.

Although shutdown circuit 258' is described in as part of circuit 200" and shutdown circuit 258 is described as part of circuit 200', one skilled in the art will recognize that either shutdown circuit 258 or 258' (or any equivalent) may be used with either circuit 200' or 200" (or any equivalent).

Figure 3:
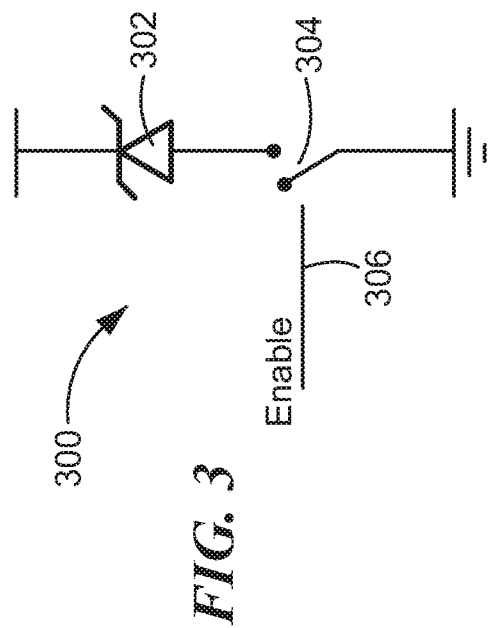
FIG. 3 is a circuit diagram of an example ESD clamp circuit.

Referring to FIG. 3, conduction path circuit 300 may be the same as or similar to conduction path circuits 202-208. conduction path circuit 300 may include a Zener diode 302 and switch 304. Zener diode 302 may have a reverse breakdown voltage sufficiently large so that Zener diode 302 conducts current during an overvoltage condition, but does not conduct current during normal operation of the protected circuit. Switch 304 may be a field effect transistor, a bipolar junction transistor, a mechanical switch or relay, or any type of circuit or device that can act as a switch. Switch 304 may be responsive to an enable signal 306 that causes switch 304 to open (e.g. act as an open circuit) or close (e.g. act as a short circuit). Enable signal 306 may be a voltage signal, for example if switch 304 is a field effect transistor, or a current signal, for example if switch 304 is a bipolar junction transistor. In embodiments, enable signal 306 is coupled to clamp control circuit 214, which drives enable signal 306 to turn conduction path circuit 300 on and off.

Figure 4:
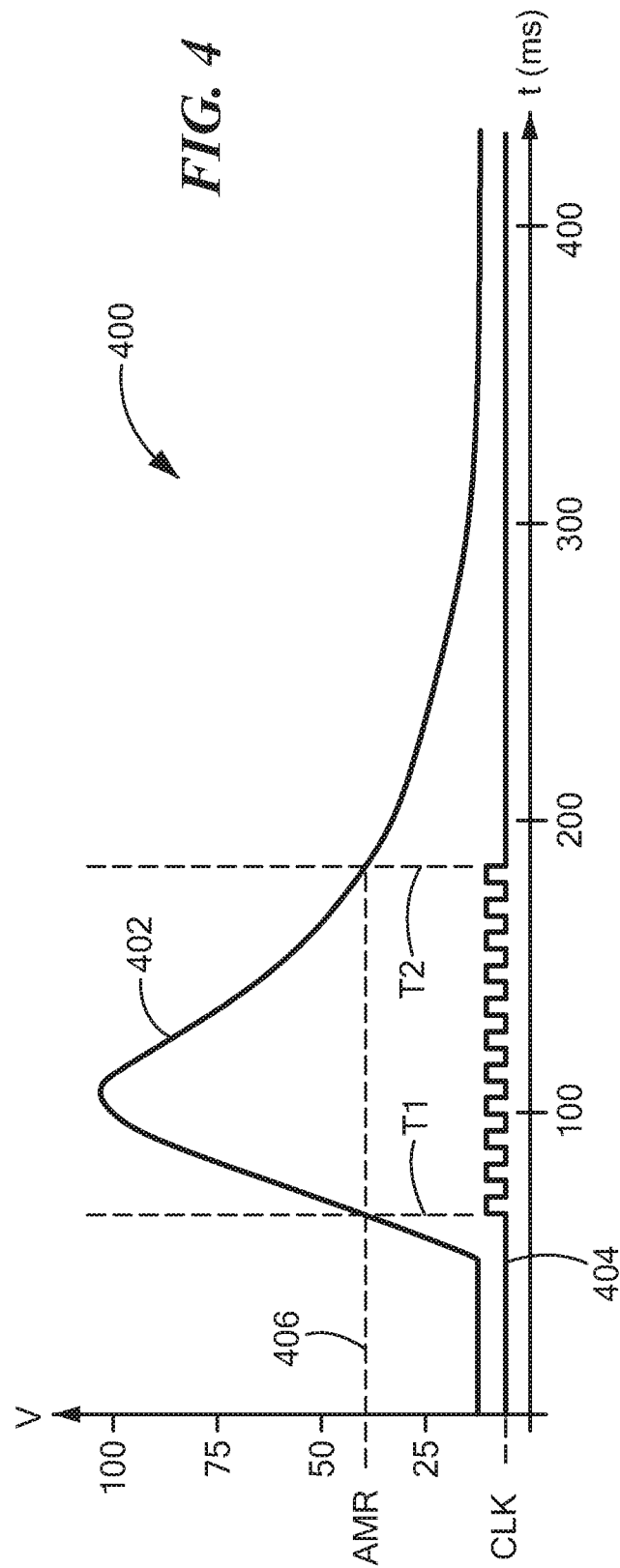
FIG. 4 is a graph of an overvoltage condition.

Referring to FIG. 4, a graph 400 illustrates an overvoltage condition of circuit 200. The horizontal axis represents time and the vertical axis represents voltage. Curve 402 represents the voltage between terminal 210 and terminal 212 and curve 404 represents the output signal 220a of clock circuit 220. In an embodiment, threshold voltage 406, about 37 V in FIG. 4, is the threshold voltage at which level detect circuit 216 determines an overvoltage event is occurring.

Level detect circuit 216 may compare curve 402 to threshold 406. As curve 402 rises above threshold 406 at point T1, clamp control circuit 214 may activate clock circuit 220 so that clock circuit 220 generates output signal 220a (shown as curve 404 in FIG. 4). During the time between T1 and T2, when clock circuit 220 is active, clamp control circuit may selectively activate conduction path circuits 202-208 so that current associated with the overvoltage event can flow through conduction path circuits 202-208. At time T2, as curve 402 descends below threshold 406 (e.g. when a portion of the current from the overvoltage event has dissipated), clamp control circuit 214 may deactivate clock circuit 220 so that clamp control circuit 214 no longer selectively activates conduction path circuits 202-208. In the time period after T2, one or more of conduction path circuits 202-208 may remain in the on state so that overvoltage event current can be dissipated. In an embodiment, circuit 200 includes another conduction path circuit (not shown) that is permanently in the on state to provide additional protection in the case of an overvoltage event.

Figure 5:
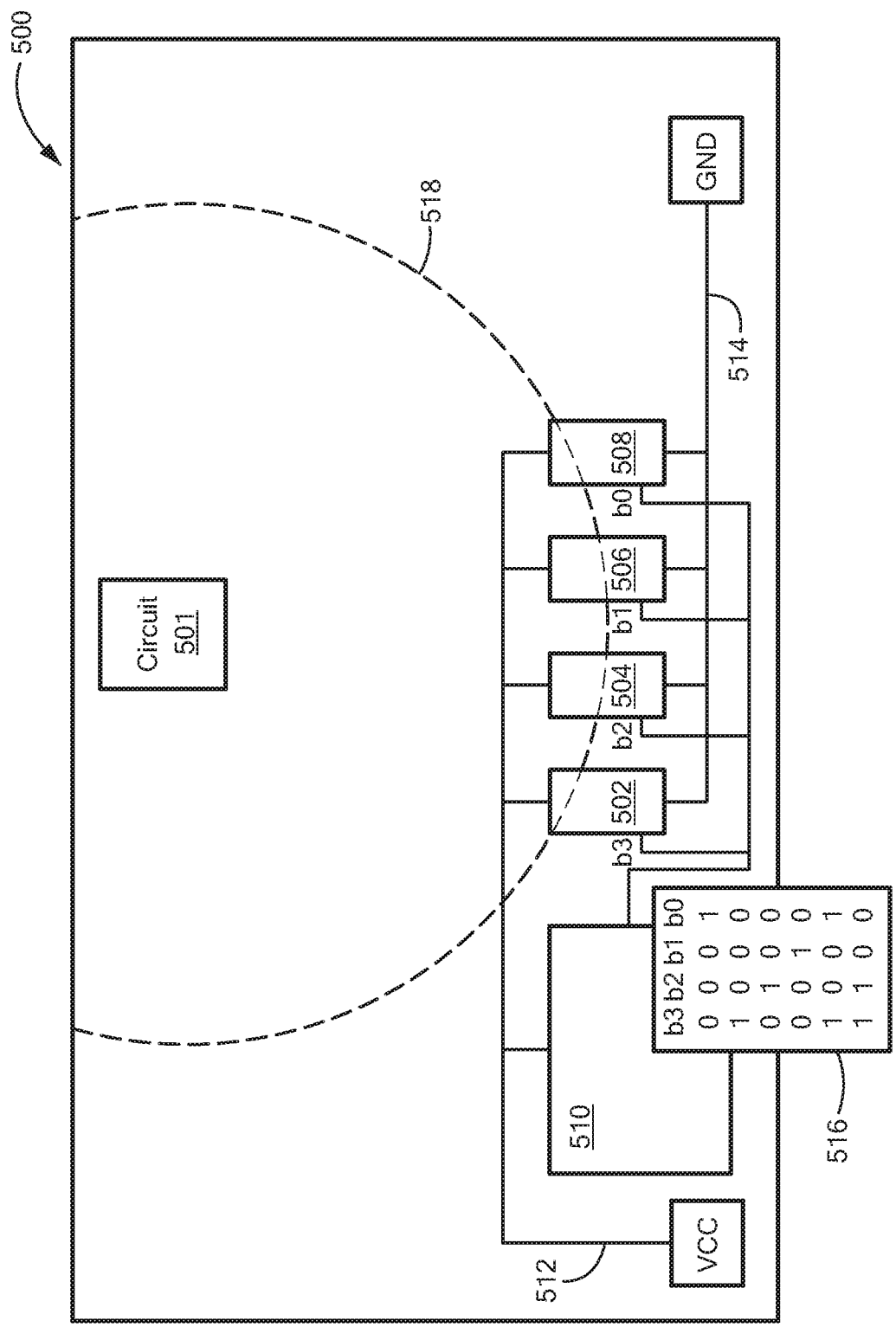
FIG. 5 is a block diagram of an embodiment of a circuit having multiple ESD conduction paths.

Referring to FIG. 5, circuit 500 may be the same as or similar to circuit 200. Protected circuit 501 may be the same as or similar to protected circuit 201; clamp control circuit 510 may be the same as or similar to clamp control circuit 214; conduction path circuits 502-508 may be the same as or similar to conduction path circuits 202-208; and terminals 512 and 514 may be the same as terminals 210 and 212, respectively.

In FIG. 5, clamp control circuit 510 may generate a pseudo-random pattern 516. Each line in pattern 516 may represent a pseudo random byte. As an example, the first byte is 0001, the second is 1000, the third is 0100, the fourth is 0010, the fifth is 1001, and the sixth is 1100. Each bit in these bytes may be used as an enable signal for the conduction path circuits. For example, the first bit b3 may be coupled to the enable signal of conduction path circuit 502, the second bit b2 may be coupled to the enable signal of conduction path circuit 504, and so on.

In an embodiment, when a bit in pattern 516 is zero (i.e. logic low), the corresponding conduction path circuit is turned off, and when a bit in pattern 516 is one (i.e. logic high), the corresponding conduction path circuit is turned on and able to conduct current. Of course, in embodiments, the opposite may be true.

In an embodiment, the lines (i.e. the bytes) in pattern 516 are applied to the enable lines of conduction path circuits 502-508 sequentially, so that the first byte is applied first, the second byte is applied second, etc. The duration that each byte is applied to the enable lines of conduction path circuit 502-508 can vary. In an embodiment, each byte is applied to the enable lines for the duration of one clock cycle of clock circuit 220, for example. In other embodiments, each byte is applied for a predetermined time. In yet other embodiments, each byte is applied until a temperature threshold is reached. For example, clamp control circuit 510 may poll the temperature of one or more of conduction path circuits 502-508. If the temperature of an conduction path circuit exceeds a predetermined threshold, clamp control circuit 510 may then apply the next byte to the enable signals of conduction path circuits 502-508.

One skilled in the art will recognize that, in the embodiments shown, pattern 515 may be organized into bytes because there are four conduction path circuits shown. However, in other embodiments, more or fewer conduction path circuits may be included in circuit 500 and, accordingly, pattern 516 may have any appropriate width appropriate to the number of conduction path circuits.

Protected circuit 501 may be positioned so that heat, represented by heat gradient 518, generated by protected circuit 501 may heat each conduction path circuit by a similar amount while protected circuit 501 is operating. In addition, when conduction path circuits 502-508 are turned on and conduct current from an overvoltage event, the current through the conduction path circuit 502-508 may further heat the conduction path circuit. Thus, it may be desirable to selectively turn the conduction path circuits on and off so that, while the conduction path circuit is turned off, any heat from conducting current has time to dissipate. This can prevent conduction path circuits 502-508 from overheating.

One skilled in the art will recognize that heat may be produced by sources other than or in addition to protected circuit 501, including but not limited to out-of-package heat sources, in-package heat sources, on-die heat sources, etc.

In the case where conduction path circuits 502-508 are heated relatively evenly by circuit 501, a pseudo-random bit pattern 516 may be applied to conduction path circuits. The pseudo-random pattern will result in each conduction path circuit 502-508 being selectively turned on and off for approximately the same amount of time. This may effectively distribute the amount of current dissipated by the conduction path circuits approximately evenly between the conduction path circuits so that no single conduction path circuit becomes overheated. One skilled in the art will note that the pseudo-random pattern may result in one or more than one conduction path circuit at a time being turned on and able to conduct current. In embodiments, a bit pattern that turns all the conduction path circuits off at the same time may be prevented by clamp control circuit 510. In other embodiments, a bit pattern that turns all the conduction path circuits off at the same time may be allowed.

Figure 6:
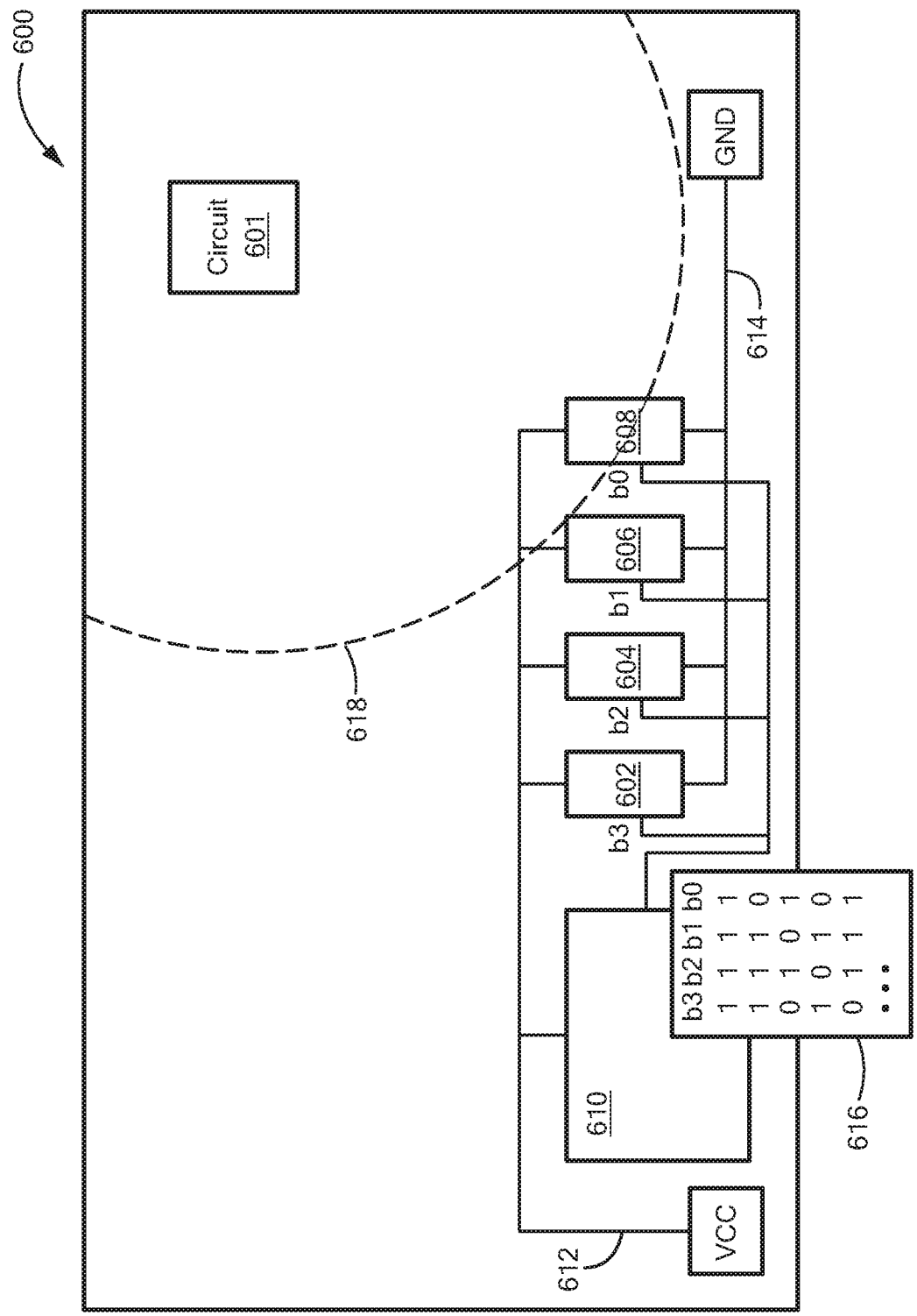
FIG. 6 is a block diagram of another embodiment of a circuit having multiple ESD conduction paths.

Referring to FIG. 6, circuit 600 may be the same as or similar to circuit 200. Protected circuit 601 may be the same as or similar to protected circuit 201; clamp control circuit 610 may be the same as or similar to clamp control circuit 214; conduction path circuits 602-608 may be the same as or similar to conduction path circuits 202-208; and terminals 612 and 614 may be the same as terminals 210 and 212, respectively.

In FIG. 6, clamp control circuit 610 may be a programmable clamp control circuit that can generate a programmed pattern 616. Each line in pattern 616 may be computed according to an algorithm or programmed into a memory (e.g. a ROM, RAM, or set of registers) associated with clamp control circuit 610. As an example, the first byte is 1111, the second is 1110, the third is 0101, the fourth is 1010, and the fifth is 0111. Each bit in these bytes may be used as an enable signal for the conduction path circuits. For example, the first bit b3 may be coupled to the enable signal of conduction path circuit 602, the second bit b2 may be coupled to the enable signal of conduction path circuit 604, and so on.

In an embodiment, when a bit in pattern 616 is zero (i.e. logic low), the corresponding conduction path circuit is turned off, and when a bit in pattern 616 is one (i.e. logic high), the corresponding conduction path circuit is turned on and able to conduct current. Of course, in embodiments, the opposite may be true.

Pattern 616 may be a preset pattern programmed into a memory, or may be a function or algorithm such as walking ones, walking zeroes, grey code, or any other type of algorithm that can change the value of the bits in pattern 616.

Protected circuit 601 may be positioned so that conduction path circuits closest to protected circuit 601 receive more heat from protected circuit 601. As shown by heat gradient 618, protected circuit 601 may heat conduction path circuits 608 and 606 more than conduction path circuits 604 and 602 because conduction path circuits 608 and 606 are closer than conduction path circuits 604 and 602 to protected circuit 601. In addition, when conduction path circuits 602-608 are turned on and conduct current from an overvoltage event, the current through the conduction path circuit 602-608 may further heat the conduction path circuit. Thus, it may be desirable to selectively turn the conduction path circuits on and off according to a preset pattern or algorithm so that, while the conduction path circuit is turned off any heat from conducting current has time to dissipate.

One skilled in the art will recognize that heat may be produced by sources other than or in addition to protected circuit 601, including but not limited to out-of-package heat sources, in-package heat sources, on-die heat sources, etc.

Because ESD circuits 608 and 606 may receive more heat from protected circuit 601, a programmed pattern or algorithm that results in ESD circuits 602 and 604 being turned on relatively more frequently than ESD circuits 606 and 608 may be beneficial. Thus, in embodiments, pattern 616 may comprise a bit pattern that allows conduction path circuits 602 and 604 to be enabled for more time than conduction path circuits 606 and 608. In general, pattern 616 may be configured so that the conduction path circuits that receive the most heat from protected circuit 601 are enabled for the least amount of time and the conduction path circuits that receive the least heat from protected circuit 601 are enabled for the most amount of time. In embodiments, a bit pattern that turns all the conduction path circuits off at the same time may be prevented by clamp control circuit 610. In other embodiments, a bit pattern that turns all the conduction path circuits off at the same time may be allowed.

Pattern 616 may be generated in response to the measured temperature of conduction path circuits 602-608. Clamp control circuit 610 may monitor the temperature of conduction path circuits 602-608 and may generate pattern 616 based on the measurements. For example, if conduction path circuit 608 is at a relatively high temperature, clamp control circuit 610 may generate a pattern 616 that alters the duty cycle and/or frequency of the bit b0 so that conduction path circuit 608 is in the on state less frequently or for shorter durations of time. Additionally or alternatively, if conduction path circuit 602 is at a relatively lower temperature, clamp control circuit 610 may generate a pattern 616 that alters the duty cycle and/or frequency of the bit b3 so that conduction path circuit 602 is in the on state more frequently or for longer durations of time.

Figure 6A:
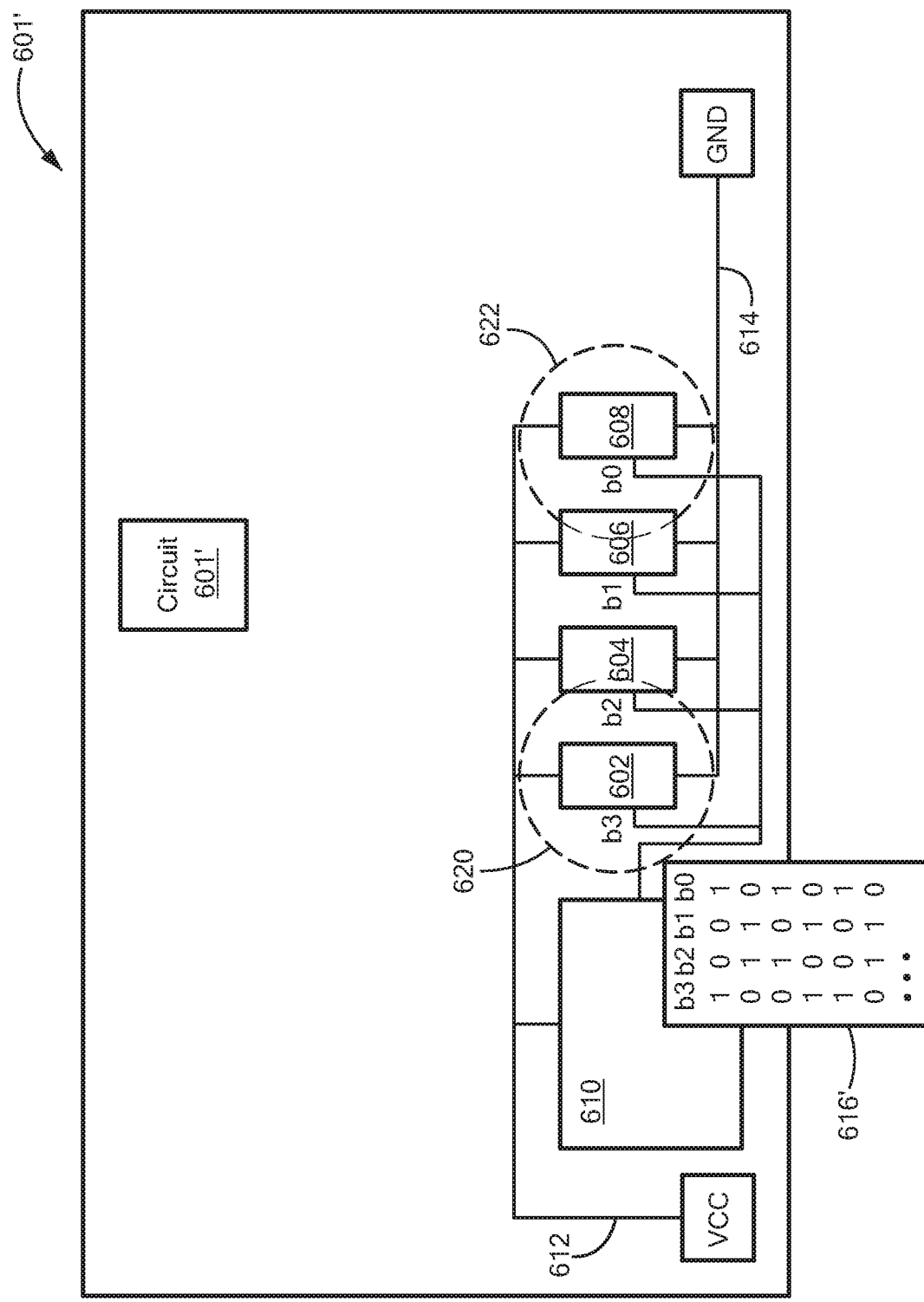
FIG. 6A is a block diagram of another embodiment of a circuit having multiple ESD conduction paths.

Referring to FIG. 6A, circuit 600' may be the same as or similar to circuit 600 and/or circuit 200. Circuit 600' includes clamp control circuit 610 which may generate or use pattern 616', conduction path circuits 602-608, terminals 612 and 614, and protected circuit 601'. Protected circuit 601' may be the same as or similar to protected circuit 601 and/or protected circuit 201.

When conduction path circuits 602-608 are enabled (i.e. in the on state) and conducting current, conduction path circuits 602-608 may generate heat. In the example shown in FIG. 6A, conduction path circuits 602 and 608 may be generating heat, as shown by heat gradients 620 and 622. In some instances, the conduction path circuits will generate heat according to a predictable pattern, which may be determined according to the layout or other design aspects of circuit 601'. Pattern 616' may be generated to compensate for the heat generation by adjusting the duty cycle and/or frequency that the conduction path circuits are turned on. Those conduction path circuits that generate more heat may be enabled for less time, for example.

Additionally or alternatively, conduction path circuits 602-608 may generate heat according to how much current flows through the ESD circuit and for how long. Clamp control circuit 610 may monitor the temperature of conduction path circuits 602-608 (by utilizing temp sensing circuit 224, for example) and may generate pattern 616' in response to the temperature readings. For example, if conduction path circuits 602 and 608 are generating heat, clamp control circuit 610 may generate a pattern 616' that turns conduction path circuits 602 and 608 off giving them time to cool, and turns conduction path circuits 604 and 606 on. Clamp control circuit 610 may continuously or periodically measure the temperature of conduction path circuits 602-608 and dynamically adjust pattern 616' so that the conduction path circuits having a lower temperature are relied on more heavily to dissipate current from an overvoltage or ESD event.

Figure 7:
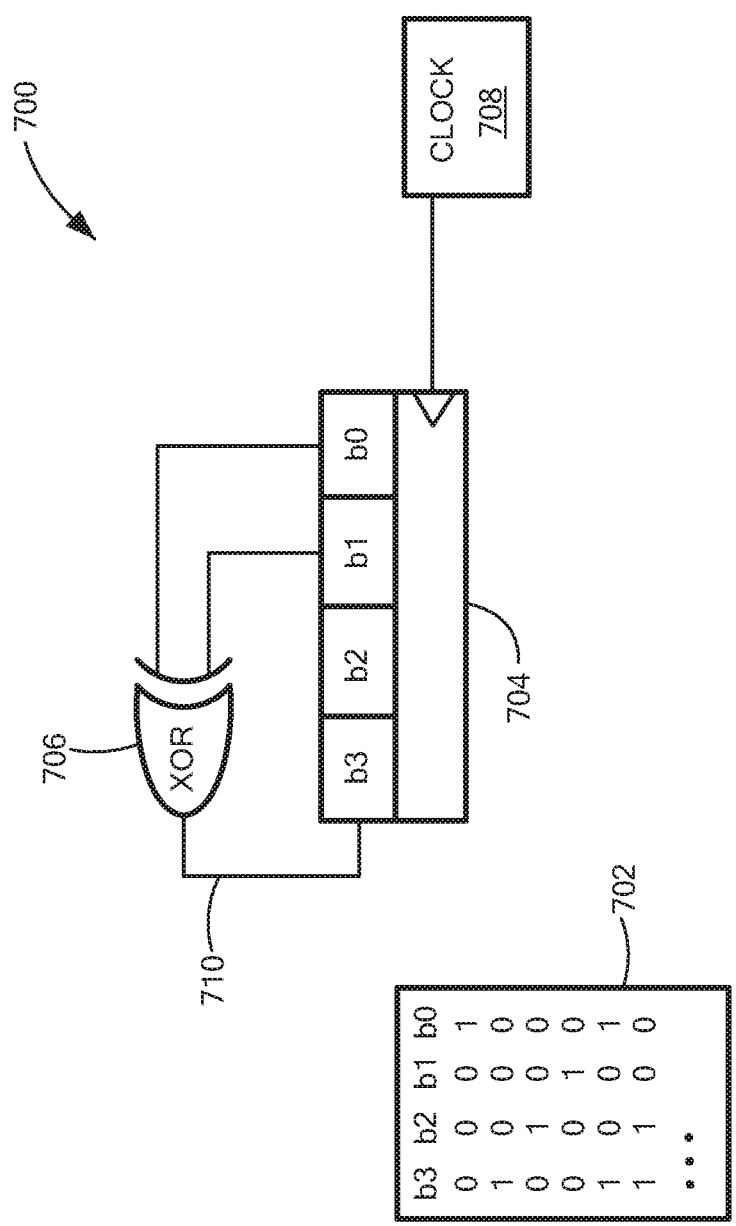
FIG. 7 is a block diagram of a control circuit for enabling an ESD clamp.

Turning now to FIG. 7, a pattern generator circuit 700 may be used by the clamp control circuit to generate a pattern 702 for controlling the conduction path circuits. Pattern generator circuit 700 may include a shift register 704, one or more logic gates 706, and a clock circuit 708. Bit signals b0, b1, b2, and b3 may be coupled to conduction path circuits as shown in FIGS. 5, 6, and 6A. In embodiments, clock circuit 708 may be the same as or similar to clock circuit 220 and pattern generator circuit 700 may be the same as or similar to pulse generator circuit 222.

Shift register 704 may be configured to shift bits b3-b0 to the right (as shown in FIG. 7). In other words, with each clock cycle, the value stored in b3 will move to b2, the value stored in b2 will move to b1, etc. Also, with each clock signal, the value of signal 710 will be stored in b3. When pattern generator circuit 700 is enabled, clock circuit 708 generates clock signal 708a, which is received by shift register 704. With each clock cycle, the bit pattern in shift register 704 is shifted one-bit to the right and signal 710 is generated based on the current values of bits b1 and b0. Pattern generator circuit 700 illustrates an example circuit for generating pattern 702. However, one skilled in the art will recognize that various logic circuits may be used to generate any pattern 710 that is desired. Additionally or alternatively, temperature readings from the conduction path circuits may be used to generate pattern 702.

In embodiments, clamp control circuit 610 can use temperature readings from any ESD clamp to load the shift register 704 to a specific pattern 702. In order to dynamically generate a specific pattern 702, clamp control circuit 610 may include a decoder with inputs from each ESD clamp. Each ESD clamp may include a thermal shutdown circuit having an output signal received by the decoder. The decoder may use the received signals to load the shift register to a specific pattern 702.

The thermal shutdown circuit may include a diode (such as diode 226, for example) to sense temperature. The diode current is converted to a voltage using a resistor and compared to a reference voltage with a comparator. The comparator output signal is used as an input signal to the decoder.

If the temperature and/or current for clamp 208 is higher than a predetermined threshold value, conduction path circuit 208 may shut down causing an output of the comparator to provide a logic high value. The decoder may then populate the shift register with the logic high signal from conduction path circuit 208. Shift register bits, 0100, deactivates conduction path circuit 208. After a predetermined time period (e.g. one or more clock cycles) ESD clamp 208 may be re-enabled. If the temperature and/or current for conduction path circuit 208 is still greater than the threshold, the decoder will again load the shift register contents to 0100 which allows the clamp additional time to cool before conduction path circuit 208 is re-enabled. The contents or bits of the shift register, prior to load, can be saved to on-chip memory and used for ESD diagnostics.

In another embodiment, the clamp control circuit uses temperature readings from each ESD clamp to selectively clear the associated bit register. This implementation could have the undesirable effect of permanently deactivating all clamps by setting all the shift register bits to zero. Thus, clamp control circuit 610 may include logic circuits that prevent all clamps from being deactivated at the same time.

In another embodiment, if the measured temperature or current for a clamp gets too high, the clamp thermal shutdown circuit would temporarily deactivate the clamp. This type of thermal shutdown circuit would include a comparator with hysteresis to ensure sufficient cooling time. This embodiment would work asynchronously and would not require a decoder. The shift register would function uninterrupted without feedback from the decoder. Using multiple conduction path circuits that can be enabled and disabled (i.e. turned on and off) may reduce or eliminate the need for high voltage/power components in the conduction path circuits. This can reduce the part cost and/or the semiconductor area needed by the conduction path circuits.

Having described preferred embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims. All references cited herein are hereby incorporated herein by reference in their entirety.

The invention claimed is:

1. An apparatus comprising:
    first terminal;
    a second terminal;
    a first conduction path circuit coupled between the first and second terminals in parallel with a load, wherein the first conduction path circuit includes a first input terminal to receive a first enable signal which, when activated, allows the first conduction path circuit to conduct a first electrical current between the first and second terminals;
    a second conduction path circuit coupled between the first and second terminals in parallel with the load, wherein the second conduction path circuit includes a second input terminal to receive a second enable signal which, when activated, allows the second conduction path circuit to conduct a second electrical current between the first and second terminals; and
    a control circuit coupled to the first input terminal of the first conduction path circuit and the second input terminal of the second conduction path circuit, the control circuit being configured to enable the first conduction path circuit and the second conduction path circuit in response to detecting an overstress event and subsequently balance the first electrical current and the second electrical current by selectively activating and deactivating the first conduction path circuit and the second conduction path circuit.

2. The apparatus of claim 1, wherein the control circuit includes a pattern generator, and the first electrical current and the second electrical current are balanced based on a bit pattern that is generated by the pattern generator.

3. The apparatus of claim 2, wherein the pattern generator includes a shift register, and the bit pattern is generated by shifting an initial bit pattern that is loaded into the shift register.

4. The apparatus of claim 1, wherein the first conduction path circuit comprises a Zener diode and a switch.

5. The apparatus of claim 4, wherein the control circuit is configured to open and close the switch.

6. The apparatus of claim 1, wherein the control circuit includes a timing circuit, and balancing the first electrical current and the second electrical current includes:
    (i) monitoring the first electrical current and using the timing circuit to turn off the first conduction path circuit for a first predetermined time period when the first electrical current exceeds a threshold, and
    (ii) monitoring the second electrical current and using the timing circuit to turn off the second conduction path circuit for a second predetermined time period when the second electrical current exceeds a threshold.

7. The apparatus of claim 1, wherein the overstress event includes an overvoltage event, the apparatus further comprising an overvoltage detect circuit.

8. The apparatus of claim 7, wherein the control circuit is configured to detect the overstress event based on an overvoltage signal provided by the overvoltage detect circuit.

9. The apparatus of claim 8, wherein the overvoltage signal activates a clock circuit of the control circuit or couples a clock circuit to the first enable signal of the first conduction path circuit.

10. The apparatus of claim 3, further comprising:
    a first thermal shutdown circuit that is coupled to the first conduction path circuit, the first thermal shutdown circuit being configured to generate a first signal; and
    a second thermal shutdown circuit that is coupled to the second conduction path circuit, the second thermal shutdown circuit being configured to generate a second signal,
    wherein the initial bit pattern is loaded into the shift register based on the first signal and the second signal.

11. The apparatus of claim 1, wherein the control circuit is configured to balance the first electrical current and the second electrical current according to a predetermined pattern.

12. The apparatus of claim 1, wherein the control circuit is configured to activate only one of the first and second conduction path circuits at a time.

13. The apparatus of claim 1, wherein the control circuit is configured to concurrently activate the first and second conduction path circuits.

14. The apparatus of claim 1, wherein the overstress event includes an overcurrent event, the apparatus further comprising a current sense circuit to measure a current through the first conduction path circuit.

15. The apparatus of claim 14, wherein the control circuit is configured to detect the overstress event based on a signal provided by the current sense circuit.

16. The apparatus of claim 1, further comprising a package, wherein the first and second terminals extend outside of the package.

17. A method comprising:
    providing a first conduction path circuit coupled between a first and second terminal in parallel with a load, wherein the first conduction path circuit includes a first input terminal to receive a first enable signal which, when activated, allows the first conduction path circuit to conduct a first electrical current between the first and second terminals;
    providing a second conduction path circuit coupled between the first and second terminals in parallel with the load, wherein the second conduction path circuit includes a second input terminal to receive a second enable signal which, when activated, allows the second conduction path circuit to conduct a second electrical current between the first and second terminals;
    providing a control circuit coupled to the first input terminal of the first conduction path circuit and the second input terminal of the second conduction path circuit, the control circuit being configured to enable the first conduction path circuit and the second conduction path circuit in response to detecting an overstress event and subsequently balance the first electrical current and the second electrical current by selectively activating and deactivating the first conduction path circuit and the second conduction path circuit.

18. The method of claim 17, wherein the control circuit includes a pattern generator, and the first conduction path circuit and the second conduction path circuit are activated based on a bit pattern that is generated by the pattern generator.

19. The method of claim 18, the pattern generator includes a shift register, and the bit pattern is generated by shifting an initial bit pattern that is loaded into the shift register.

20. The method of claim 19, further comprising:
providing a first thermal shutdown circuit that is coupled to the first conduction path circuit, the first thermal shutdown circuit being configured to generate a first signal;
providing a second thermal shutdown circuit that is coupled to the second conduction path circuit, the second thermal shutdown circuit being configured to generate a second signal, and
loading the initial bit pattern into the shift register based on the first signal and the second signal.

21. The method of claim 17, wherein the control circuit includes a timing circuit, and balancing the first electrical current and the second electrical current includes:
(i) monitoring the first electrical current and using the timing circuit to turn off the first conduction path circuit for a first predetermined time period when the first electrical current exceeds a threshold, and
(ii) monitoring the second electrical current and using the timing circuit to turn off the second conduction path circuit for a second predetermined time period when the second electrical current exceeds a threshold.

22. The method of claim 17, wherein the overstress event includes one of an overvoltage event or an overcurrent event.

23. An apparatus comprising:
a first terminal;
a second terminal;
a plurality of conduction path circuits coupled between the first and second terminals in parallel with a load, wherein each of the plurality of conduction path circuits includes an input terminal to receive an enable signal which, when activated, allows the conduction path circuit to conduct electrical current between the first and second terminals; and
a control circuit including a shift register having a plurality of register cells, the plurality of register cells being configured to store a bit pattern, each of the plurality of register cells being coupled to a different one of the plurality of conduction path circuits, wherein, when a current through the load exceeds a threshold, the control circuit is configured to asynchronously disable and enable the plurality of conduction path circuits by shifting the shift register.

* * * * *